United States Patent
Zinner et al.

(10) Patent No.: US 12,341,626 B2
(45) Date of Patent: Jun. 24, 2025

(54) METHOD FOR OPTIMIZING THE TRANSFER DATA RATE IN A SENSOR NETWORK IN PARTIAL NETWORK OPERATION IN AN ETHERNET NETWORK

(71) Applicant: Continental Automotive Technologies GmbH, Hannover (DE)

(72) Inventors: Helge Zinner, Frankfurt am Main (DE); Daniel Hopf, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 73 days.

(21) Appl. No.: 18/039,841

(22) PCT Filed: Nov. 30, 2021

(86) PCT No.: PCT/DE2021/200228
§ 371 (c)(1),
(2) Date: Jun. 1, 2023

(87) PCT Pub. No.: WO2022/122093
PCT Pub. Date: Jun. 16, 2022

(65) Prior Publication Data
US 2024/0022450 A1 Jan. 18, 2024

(30) Foreign Application Priority Data
Dec. 11, 2020 (DE) .............. 10 2020 215 763.4

(51) Int. Cl.
*H04L 12/40* (2006.01)
*H04L 47/70* (2022.01)

(52) U.S. Cl.
CPC ........ *H04L 12/4013* (2013.01); *H04L 47/821* (2013.01)

(58) Field of Classification Search
CPC .............. H04L 12/4013; H04L 47/821; H04L 12/40019; H04L 2012/4026; H04L 2012/40273; H04L 12/40156
See application file for complete search history.

(56) References Cited

U.S. PATENT DOCUMENTS 6,665,601 B1 * 12/2003 Nielsen ................... H04L 12/40
710/60
9,143,348 B2 9/2015 Boeck et al.
(Continued)

FOREIGN PATENT DOCUMENTS

| DE | 102006003067 A1 | 7/2007 |
| DE | 102011085764 A1 | 5/2013 |

(Continued)

OTHER PUBLICATIONS

IEEE Std 802.3ch-2020, IEEE Standard for Ethernet—Amendment 8: Physical Layer Specifications and Management Parameters for 2.5 GB/s, 5 GB/s, and 10 GB/s Automotive Electrical Ethernet, Jun. 4, 2020, 207 pages, ISBN 978-1-5044-6770-4, URL: https://ieeexplore.ieee.org/stamp/stamp.jsp?tp=&arnumber=9146430 [retrieved on Jan. 5, 2021].

(Continued)

*Primary Examiner* — Suraj M Joshi
*Assistant Examiner* — Jaren Means
(74) *Attorney, Agent, or Firm* — Buchanan Ingersoll & Rooney PC (57) ABSTRACT

The method includes the following steps: a) a head node determining the number of active nodes; b) the head node classifying the identified nodes into two or more classifications of nodes in order to prioritize the Ethernet network communication; c) the head node receiving reservation requests from at least some of the multiplicity of nodes; d) allocating time slots, in response to reservation requests, to one or more nodes in the upcoming communication window, (Continued)

the allocations being based on a priority of the nodes and the priority being allocated to the nodes in accordance with their classification. After the number of active nodes has been determined, the bus cycle length is calculated and the number of sleeping or inactive or defective nodes is determined, and a beacon bus cycle is determined in terms of how much the bus cycle length is able to be shortened.

9 Claims, 11 Drawing Sheets

(56) References Cited

U.S. PATENT DOCUMENTS

| | | | |
|---|---|---|---|
| 2005/0213503 A1 | 9/2005 | Guo et al. | |
| 2009/0119437 A1* | 5/2009 | Hilscher | H04L 12/4135 710/305 |
| 2009/0304021 A1* | 12/2009 | Kraemer | H04L 12/417 370/468 |
| 2011/0317584 A1 | 12/2011 | Wu | |
| 2019/0230705 A1 | 7/2019 | Beruto et al. | |
| 2019/0261420 A1 | 8/2019 | Pannell et al. | |
| 2019/0313446 A1 | 10/2019 | Kim et al. | |
| 2019/0363991 A1* | 11/2019 | Sostawa | H04L 12/40156 |
| 2020/0136993 A1 | 4/2020 | Yun et al. | |
| 2022/0046114 A1* | 2/2022 | Entelis | H04L 69/04 |

FOREIGN PATENT DOCUMENTS

| | | |
|---|---|---|
| DE | 102014100628 A1 | 7/2014 |
| JP | 2007-520969 A | 7/2007 |
| JP | 2008-199179 A | 8/2008 |
| JP | 2009-524308 A | 6/2009 |
| WO | 2005/076533 A1 | 8/2005 |
| WO | 2011163074 A1 | 12/2011 |

OTHER PUBLICATIONS

IEEE P802.3cg/D3.4, Sep. 11, 2019, Draft Standard for Ethernet—Amendment 5: Physical Layer Specifications and Management Parameters for 10 Mb/s Operation and Associated Power Delivery over a Single Balanced Pair of Conductors, ISBN 978-1-5044-6134-4, 26 pages.

IEEE Std 802.1AS-2020, IEEE Standard for Local and Metropolitan Area Networks-Timing and Synchronization for Time-Sensitive Applications, Jan. 30, 2020, 421 pages, ISBN 978-1-5044-6430-7, URL: https://Ieeexplore.ieee.org/stamp/stamp.jsp?tp=&arnumber=9121845 [retrieved on Jan. 5, 2021].

Axer, P. et al., "OPEN Sleep/Wake-up Specification, Sleep/Wake-up Specification for Automotive Ethernet", OPEN Alliance, Feb. 21, 2017, 17 pages.

International Search Report and Written Opinion for International Application No. PCT/DE2021/200228, mailed May 12, 2022, 16 pages.

International Search Report and Written Opinion for International Application No. PCT/DE2021/200228, mailed May 12, 2022, 24 pages (German).

German Search Report for German Application No. 10 2020 215 763.4, dated Aug. 3, 2021 with translation, 14 pages.

Notification of the International Search Report for International Application No. PCT/DE2021/200228, dated Mar. 16, 2022, 15 pages.

Office Action (Notice of Reasons for Refusal) issued Jul. 29, 2024, by the Japan Patent Office in corresponding Japanese Patent Application No. 2023-535600 and an English translation of the Office Action. (13 pages).

* cited by examiner

Starting state: Node 2 is inactive

| B | Node 0 | Node 1 | Node 2 (inactive) | Node 3 | Node 4 | Node 5 | Node 6 | Node 7 | B |

Optimization a) Reducing the Node IDs (maintaining the transmission order)

| B | Node 0 | Node 1 | Node "3" (now 2) | Node "4" (now 3) | Node "5" (now 4) | Node "6" (now 5) | Node "7" (now 6) | B |

Node 2 (inactive)

Optimization b) Moving rearmost Node IDs forward (changing the transmission order)

| B | Node 0 | Node 1 | Node "7" (now 2) | Node 3 | Node 4 | Node 5 | Node 6 | B |

Node 2 (inactive)

METHOD FOR OPTIMIZING THE TRANSFER DATA RATE IN A SENSOR NETWORK IN PARTIAL NETWORK OPERATION IN AN ETHERNET NETWORK

CROSS REFERENCE TO RELATED APPLICATIONS

This application is the U.S. National Phase Application of PCT International Application No. PCT/DE2021/200228, filed Nov. 30, 2021, which claims priority to German Patent Application No. 10 2020 215 763.4, filed Dec. 11, 2020, the contents of such applications being incorporated by reference herein.

FIELD OF THE INVENTION

The present invention relates to a method for optimizing the transmission data rate in a sensor network in partial networking within an Ethernet on-board network in a motor vehicle, to a control device and to an Ethernet on-board network.

BACKGROUND OF THE INVENTION

With 10 Mbit/s (IEEE802.3ch), in addition to 100 Mbit/s, 1000 Mbit/s and the ongoing multi-gigabit standardizations, another Ethernet standard will be available for automotive applications.

One variant of the new standard is the CSMA/CD-based MultiDrop mode. This differs significantly from the other Ethernet variants (>10 Mbit/s), since this pursues the aim of being able to design Ethernet more cost-effectively and thus also to address simpler control devices. This standard does not require any switches (switch ICs), but rather is designed as a bus (similar to CAN). This roughly halves the number of required PHYs (transceivers). Ethernet is thus becoming a serious competitor to CAN/CAN-FD and FlexRay, as it is able to significantly reduce system costs. Furthermore, typical automotive interfaces such as SPI instead of xMII are also possible for communication between controllers and physical transceivers (PHYs).

Figure 1:
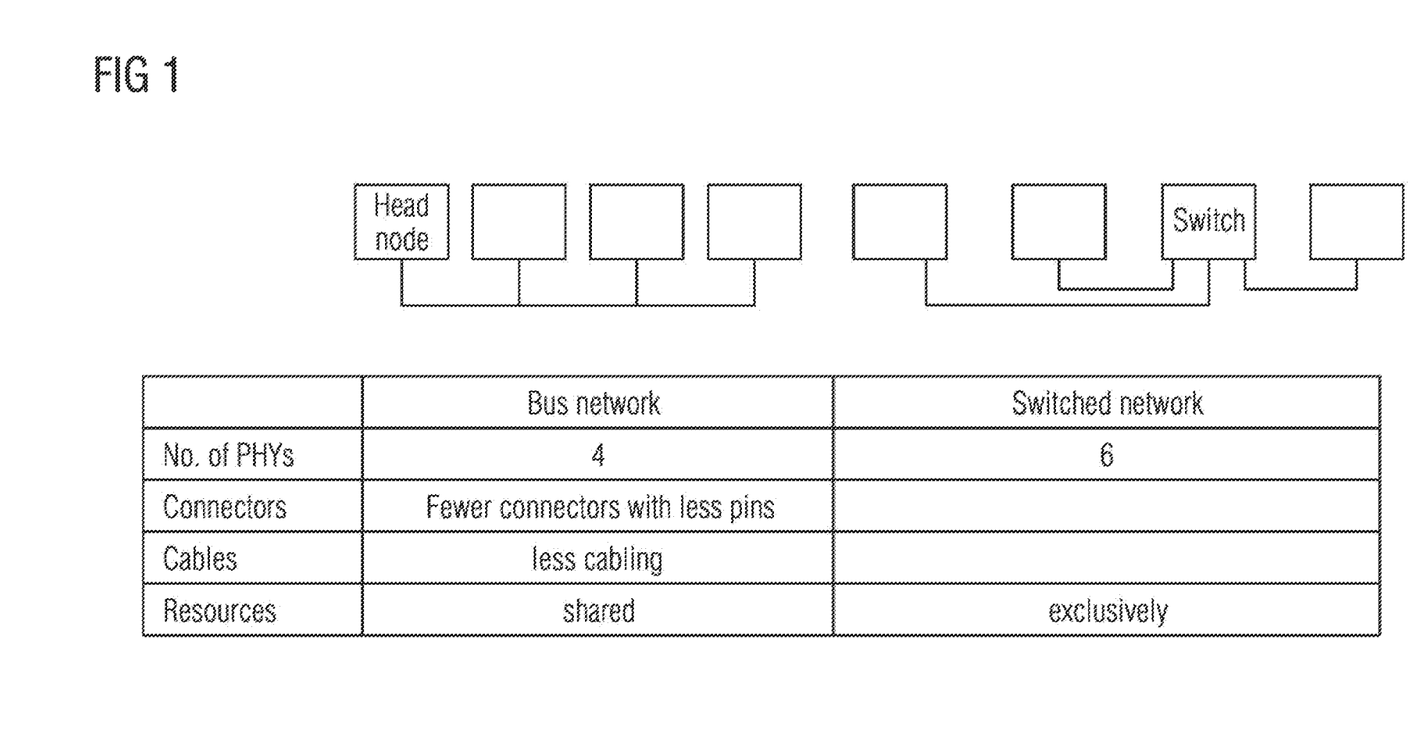
FIG. 1 shows the simplified illustration of the differences between an Ethernet bus (10 Mbit/s) and a switched network.

FIG. 1 compares the essential features of switched Ethernet and the "bus Ethernet" (MultiDrop) as defined in the IEEE standard IEEE P802.3cg. The most important difference here is that the resources, the bus access, are available exclusively with switched Ethernet, which means that any Ethernet node (ECU) is able to transmit at any time without collisions occurring in the process. A shared medium ("shared media") is used in the new Ethernet bus implementation with MultiDrop mode, that is to say it is necessary to hold off bus access until this resource is available.

The IEEE P802.3cg standard uses, inter alia, a newly defined mechanism (PLCA—Physical Layer Collision Avoidance) to avoid collisions during bus access and to implement fair access. In this case, only exactly one PHY (Physical Transceiver) ever receives access to the bus at any one time. This makes it possible to avoid collisions. Access is based on what is called a round-robin method. Each ECU (node) on the BUS has the opportunity to transmit once within a defined cycle (or order).

What is known as a head node, which takes on the function of a network controller, in this case determines the cycle and transmits recurring "beacons" on the bus. The nodes thus start a timer on the basis of their previously defined identity ID, which determines the orders as to when they are allowed to transmit, and, after said timer has expired and it is recognized that they are next, they are allowed to transmit.

Figure 2:
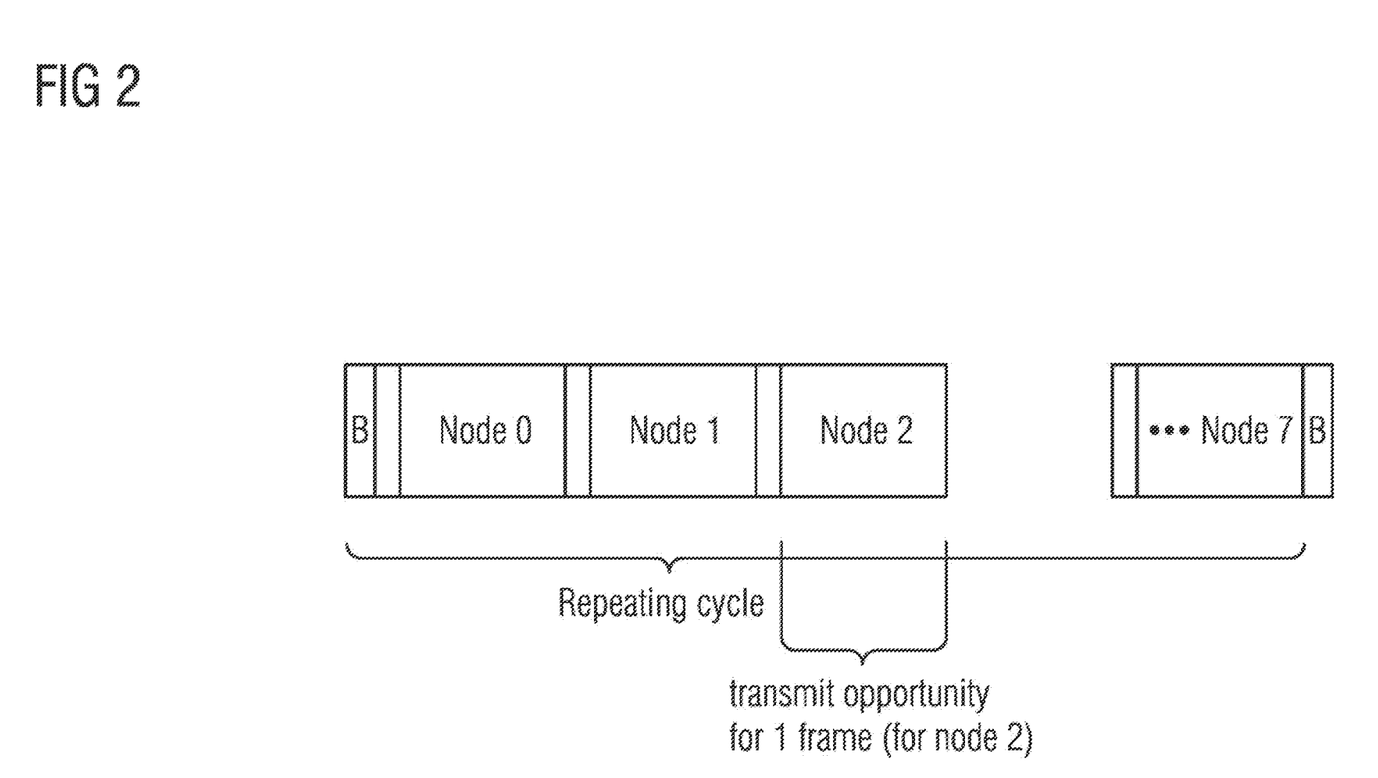
FIG. 2 shows the basic flow of communication on the Ethernet bus.

FIG. 2 shows the basic flow of communication on the Ethernet bus. After the beacon has been transmitted, it is the turn of node 0 first and, when it has finished its transmission, the next node is allowed to transmit (typically only a single Ethernet frame in each case may be transmitted in the slot).

Figure 3:
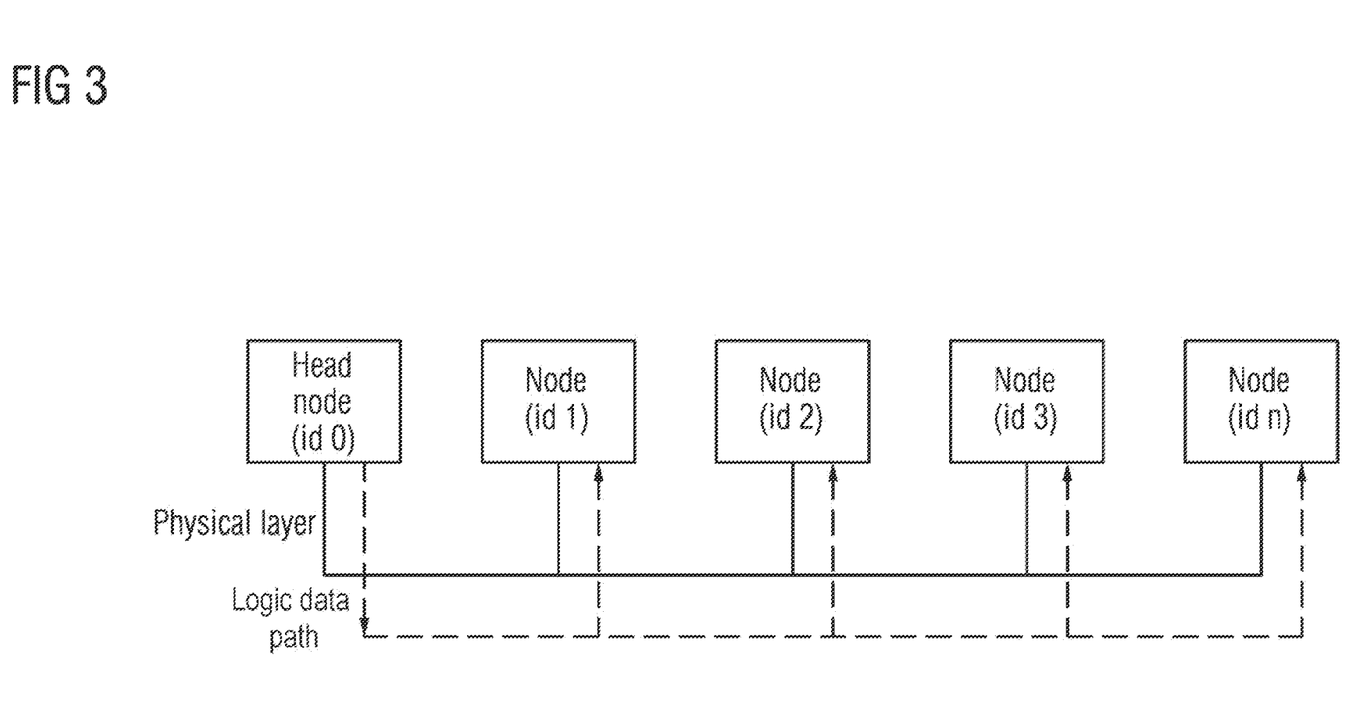
FIG. 3 shows the physical representation of the Ethernet bus with stubs.

FIG. 3 illustrates the physical representation of the Ethernet bus with stubs.

EP 2 585 940 A1, incorporated herein by reference, describes systems and methods for scheduling network communication in a managed network may comprise a network controller that recognizes multiple network nodes; the network controller classifies the recognized network nodes into two or more classifications of nodes in order to prioritize network communication at the node level; the network controller, which receives reservation requests from at least some of the multiplicity of network nodes, wherein the reservation requests request one or more time slots for their respective network nodes in an upcoming communication window; and the network controller allocates time slots in the upcoming communication window to one or more network nodes in response to reservation requests, wherein the allocation is based on a priority of the network nodes and wherein the priority is allocated to the nodes in accordance with their classification. That patent application describes that a network controller creates a cyclic media access plan (MAP) in which the access operations of the network nodes are defined in each cycle. The basis is the required quality of service, the reservation requests from the respective nodes and their priority/lower priority, from which the network controller creates the MAP. The network controller may also automatically send MAP messages without reservation requests.

In U.S. Pat. No. 2,005,213 503 A1, incorporated herein by reference, in accordance with certain described implementations, a coordinating device performs bandwidth allocation procedures based on information from previously unsatisfied bandwidth allocation requests and responds to current bandwidth allocation requests. The current bandwidth allocation requests specify the currently requested bandwidth amounts for multiple streams, and the current bandwidth allocation requests may be received from multiple entities with multiple streams. The information from previously unsatisfied bandwidth allocation requests is taken into consideration when allocating the available bandwidth between multiple streams from multiple entities for the currently requested bandwidth amounts. When planning the bus access of the network nodes, the 'unserved' access reservation from the previous cycle is also taken into consideration by the head node.

In contrast to a switched network (as with 100/1000 etc. Mbit/s), with 10 Mbit/s, as described, the bus cannot be accessed immediately, but it is necessary to wait for the respective time.

Partial networking (aka sleep/wakeup) is becoming an increasingly important function for motor vehicles and, for example, also for the Ethernet bus. In this case, control devices are woken up or put to sleep as required (also via the bus), in order for example to save energy or to start them up.

Compared to other Ethernet types, the 10 Mbit bus offers a significantly lower data rate, which is why special consideration has to be given to efficiency of the data transmission and the latency of the transmission and also the access time. If security also becomes part of the 10 Mbit/s system, then there is hardly any remaining data rate for payload data, as is similarly the case for current CAN-FD implementations.

With the partial networking function, it is necessary to give additional consideration to the access times and the efficiency of the bus, since this is a new scenario that was not considered in the standard.

Figure 4:
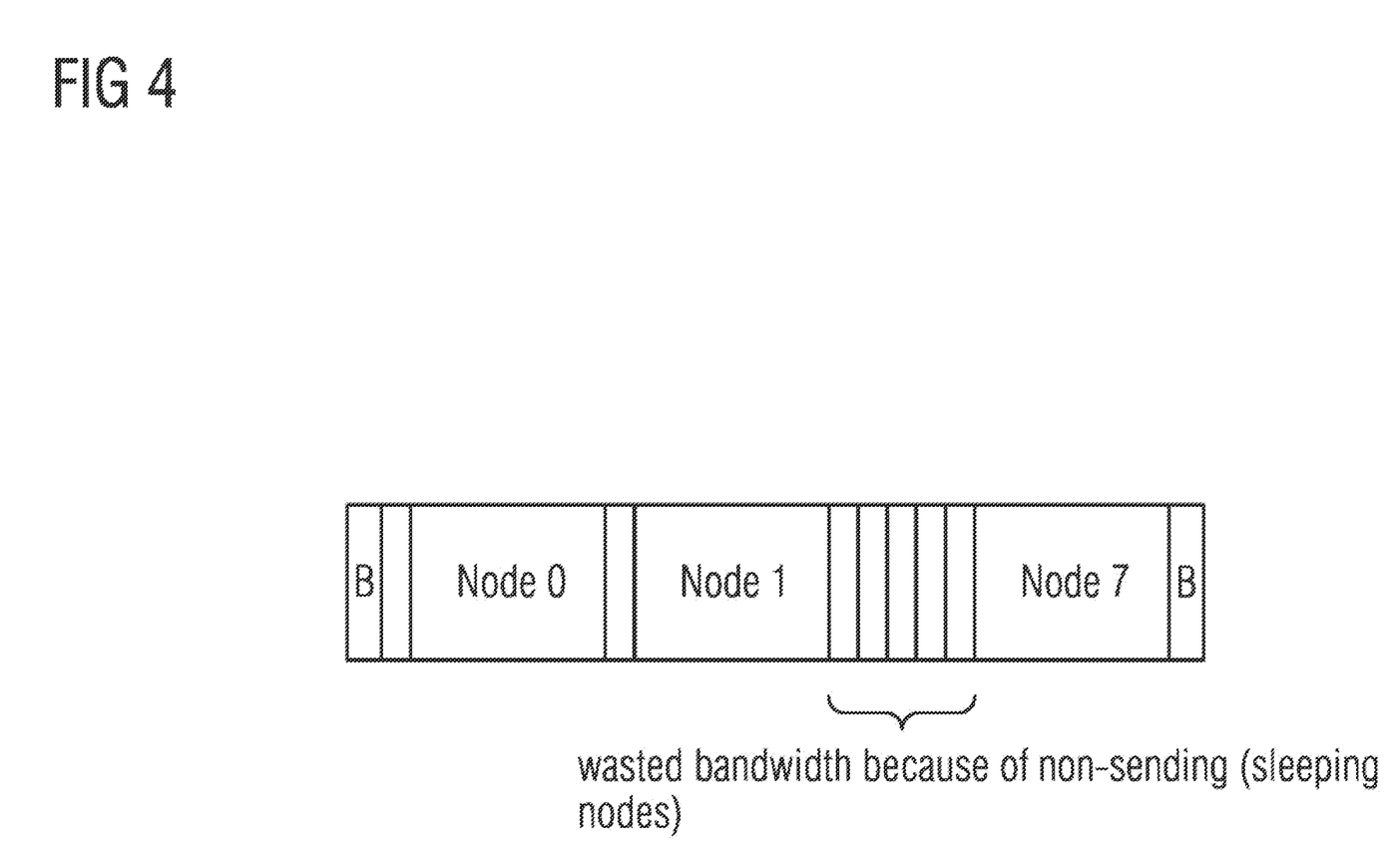
FIG. 4 shows that, in the case of sleeping nodes, the bus not only massively wastes bandwidth, but also needlessly increases the latency of the other nodes.

FIG. 4 illustrates the general problem. For sleeping or defective nodes (control devices), bandwidth is wasted/kept available for all nodes. This limits the bandwidth of the bus and consumes resources unnecessarily.

The problem at present is that the standard allows only one frame to be transmitted per cycle, and thus the remaining data rate for the respective node (here specifically the master node or head node) decreases as the number of participants on the bus increases.

The head node will be implemented either in a head unit, a gateway, a fusion unit or generally in a zone controller, that is to say usually on the same control unit from which updates or diagnostic queries also emanate.

It is known to use what is known as a burst mode, in which nodes are able to send at most 255 packets during their cycle, but this mode needs to be statically preconfigured and maintained.

In partially automated and highly automated driving, there are increasing demands on the vehicle that require hard real-time support from the transmission network and the protocols, as is already the case at present in aircraft or industrial automation.

An on-board electrical system will also be much more flexible in the future than it is today. Nodes are deactivated during operation when they are not needed (this is also called partial networking). This in turn means that the on-board electrical system will dynamically change to a very large degree at runtime. These functions are already being implemented and mass-produced for 2020.

SUMMARY OF THE INVENTION

An aspect of the invention is to adapt the new Ethernet technologies in a cost-optimized manner and with low implementation effort.

An aspect of the invention advantageously adapts the new Ethernet technologies in terms of costs and implementation effort for use in motor vehicles.

An aspect of the invention proposes a method that adapts the bus cycle to the data rate requirements of the head node. In other words, more bandwidth may be dynamically allocated to the head node as needed. An aspect of the invention proposes a method that, depending on the size of the data to be transmitted, adapts the bus cycle such that the download/update requirements on the transmission time are not infringed. The method in this case calculates how much bandwidth has to be provided at what time. However, the method in the process always takes the standard into consideration and does not have to intervene on the other nodes.

Figure 5:
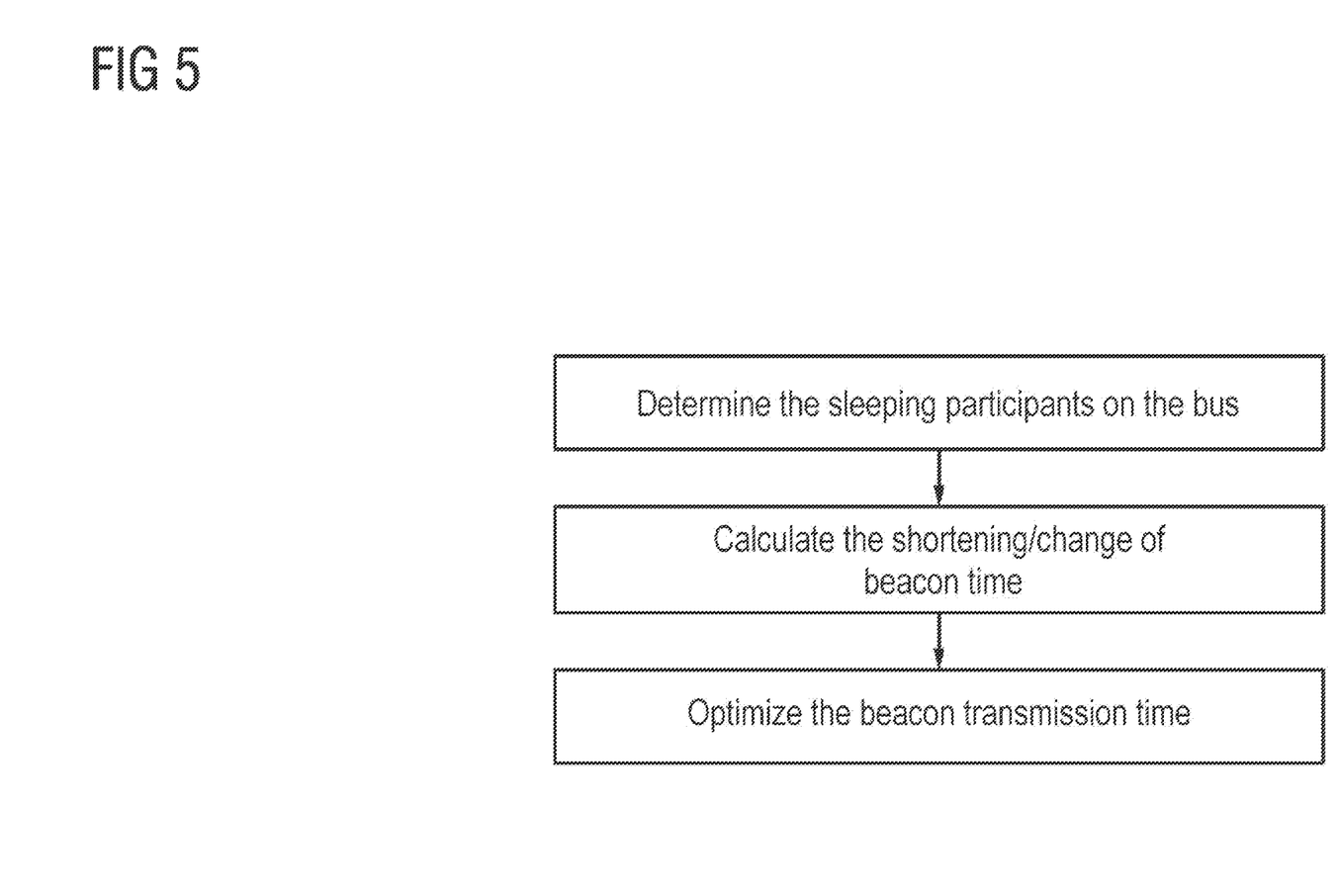
FIG. 5 shows the dynamic adaptation of the transmission time windows.
Figure 6:
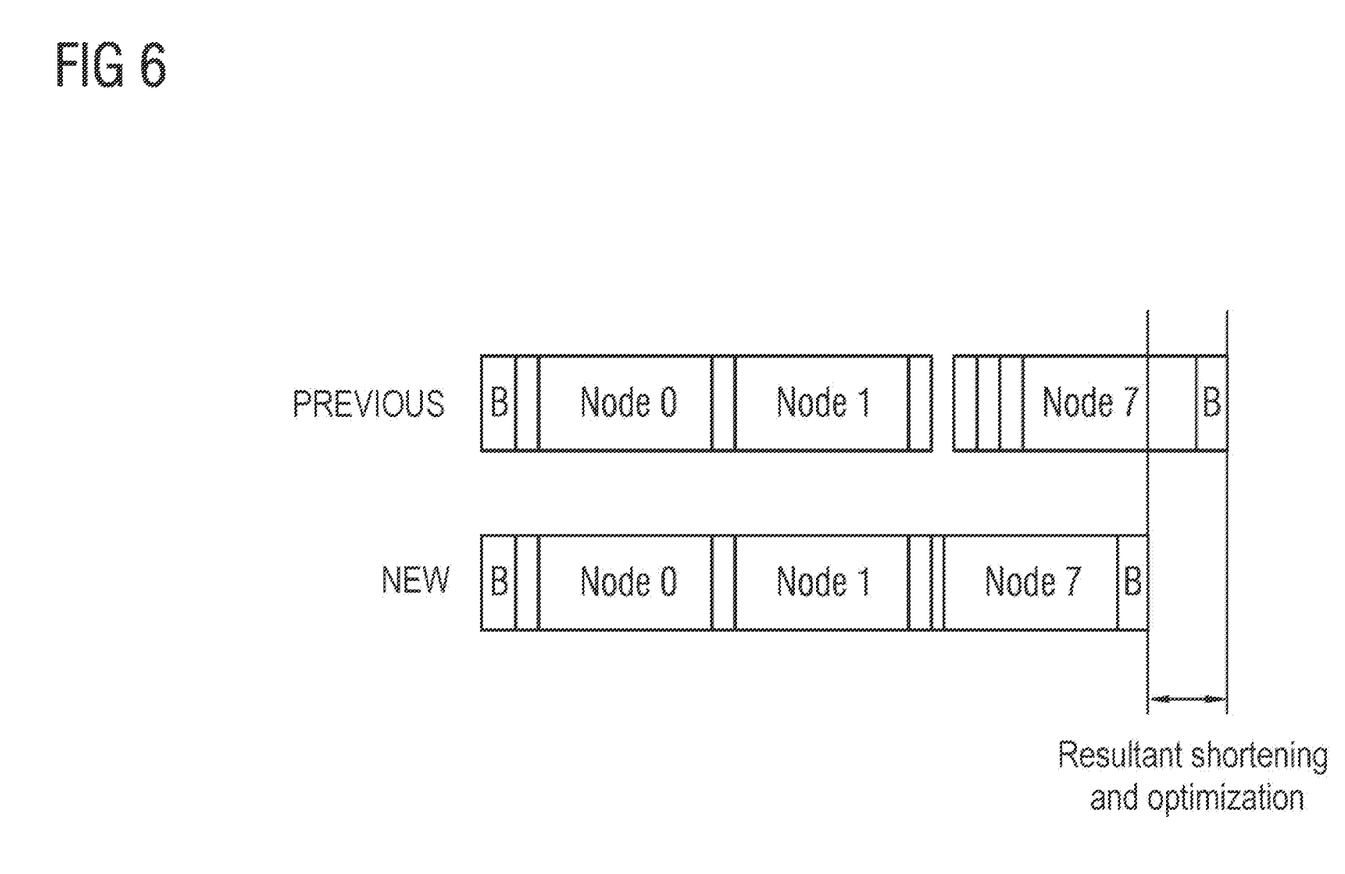
FIG. 6 shows the solution and advantage of individually shortening and adapting the schedule or bus cycle.

An aspect of the invention proposes a method that dynamically adapts the "bus cycle" or the transmission time of the beacons to the current and future network behavior, as indicated in FIG. 5. In other words, the bus is adapted accordingly by removing the unused transmission slots and moving them so that other nodes thus receive faster access to the bus, as indicated in FIG. 6. There has been no provision for this until present, but it may be implemented without additional effort using only software and configuration without using new hardware.

The solution and advantage of the method according to an aspect of the invention lies in the individual shortening and adaptation of the schedule or bus cycle. By transmitting the beacon frame earlier, illustrated as 'B' in FIG. 6, the following bus cycles are always able to be performed earlier. The transmission slots of the individual nodes may be between 64 and 1522 bytes in size and are always shown with the same size merely for the sake of simplicity.

The quality of the execution of sensor-based applications (for example automated driving, data loggers, diagnosis) may advantageously be increased by an aspect of the invention. The concept may be implemented without additional financial expenditure (hardware costs) and while complying with the standard.

The use of the newly introduced Ethernet protocol in motor vehicles necessitates mechanisms that make use of simple techniques and given properties of technologies in order to be able to do without expensive implementations and further additional hardware. The network system according to an aspect of the invention is improved in terms of reliability. By means of software-based methods, Continental can thereby get the best out of its ECU or the network and offer customers more functionality.

The advantage of the application-specific determination of a more accurate and predictable delay is an improvement in the scheduling and execution of communication in the vehicle. This means that existing bus systems are able to be used more efficiently and the jump to expensive technology with a higher bandwidth is able to be avoided. This may also affect the required buffer storage, which may then be dispensed with or made smaller. Fusions of different data, for example ultrasound, radar or microphones, may thereby be improved and made more accurate. Furthermore, the logging of data may be made even more precise.

Nowadays, applications are tailored and adapted to a platform. An aspect of the invention sets forth methods that allow software to be designed somewhat more flexibly and make the best of the underlying system without having to program it permanently into software beforehand. The starting point is what is known as the worst case, which costs resources and money and compromises quality. An aspect of the invention permits software developers and software architects to provide software/applications that may be tailored to the requirements of the application case more flexibly and precisely. Incorporating the described method into our software allows optimization to take place in each case within the control device. This means that software may be developed in a more platform-dependent manner.

Partial networking as a system function has even greater effects on the overall system if, for example, the efficiency of the bus may be influenced thereby and control devices no longer waste time "waiting", which unfortunately has to be the case with 10 Mbit/s technology.

The new technologies may no longer be held back in motor vehicles. Protocols such as IP, AVB and TSN have thousands of pages of specifications and test suites. It is not an immediate given that these new protocols are controllable in motor vehicles.

One advantage of an aspect of invention is that the usual hardware does not have to be changed, but rather the existing hardware can continue to be used. The new method can be integrated into an existing network without damaging existing devices. The standard is not infringed since the existing protocol may be used. These sensors in particular should be as cheap as possible in order to serve the mass market. If a more expensive interface such as a cable/plug is able to be dispensed with, this means great added value. In addition, the quality of the data improves the faster the data reach the bus and the less waiting and/or storage is required.

The proposal solves the problem that the beacon cycle time depends only on the bus and its configuration, but not on the individual node or its requirements. The fundamental revolution of the new architectures is characterized by the centering of the software on fewer and fewer computing units. These so-called servers or central computers no longer consist of just one µC or µP, but rather contain multiple µC, µP, SOC and also Ethernet switches with a large number of ports. They represent a separate local area network, each with individual software, which also means that the respective software components do not (cannot) know that they are communicating for example with components that are located in the same housing. A zone architecture with central servers is known. Here, on the one hand, the server contains many powerful processors and, on the other hand, a lot of software or applications are executed on it. The communication effort within the control device is enormous, and this represents a separate local area network. All of the software of the vehicle will be executed here in the future and each controller has its own software stack that is provided by different suppliers.

Concepts in order to dynamically transfer functions and applications to other control devices/processors, that is to say also in order to optimize them, are known. This is referred to as live migration, reallocation or migration. The series application for the transfer of software to other ECUs/processors is known.

By virtue of the new architectures, now for the first time there are possibilities for implementing software on different ECUs as well, since the hardware is becoming more generalized and the software less platform-dependent, wherein before now this was not possible with all functions and ECUs. Therefore, what software will run on what control device (server) is not always definite at the time when the system is designed. The shift in software is not limited here to ECU-to-ECU operations, however, but applies even more to controller-to-controller operations within the same ECU.

DESCRIPTION AND ADVANTAGES OF THE INVENTION

The concept may be implemented without additional financial expenditure, such as hardware costs, and while complying with the standard. The use of the newly introduced Ethernet protocol in motor vehicles necessitates mechanisms that make use of simple techniques and given properties of technologies in order to be able to do without expensive implementations and further additional hardware. The network system according to an aspect of the invention is improved in terms of reliability.

The advantage of the application-specific determination of a more accurate and predictable delay is an improvement in the scheduling and execution of communication in the vehicle. This means that existing bus systems are able to be used more efficiently and the jump to expensive technology (higher bandwidth) is able to be avoided. This may also have an impact on buffer storage that is required, which may then be dispensed with (or made smaller). Fusions of different data (for example ultrasound+radar or microphones) may thereby be improved and made more accurate. Furthermore, the logging of data can be made even more precise.

In the case of a software update, a more realistic time window may be reported back through an aspect of the invention and the worst case does not have to be assumed.

Thus, downloads/updates are possible that would otherwise never be started or would be started later.

The use of the method according to an aspect of the invention may be used in other industrial fields that use 10 Mbit/s Ethernet, such as for example in industrial automation.

TECHNICAL ADVANTAGES OF THE INVENTION

An aspect of the invention is advantageously achieved by a method for optimizing the transmission data rate in a sensor network in partial networking in an Ethernet network, wherein the method comprises:
  a) a head node determining the number of active nodes;
  b) the head node classifying the identified nodes into two or more classifications of nodes in order to prioritize the Ethernet network communication;
  c) the head node receiving reservation requests from at least some of the multiplicity of nodes;
  d) allocating time slots, in response to reservation requests, to one or more nodes in the upcoming communication window, the allocations being based on a priority of the nodes and the priority being allocated to the nodes in accordance with their classification, wherein, after the number of active nodes has been determined, the bus cycle length is calculated and the number of sleeping or inactive or defective nodes is determined, wherein a beacon bus cycle is determined in terms of how much the bus cycle length is able to be shortened.

In one advantageous embodiment of the method, the bus loading is monitored continuously, and the following bus cycles are performed earlier through the earlier transmission of the beacon (13').

A further advantageous embodiment of the method is distinguished in that, following determination of the bus position (Node ID) of the sleeping nodes, a check is performed to determine whether there is a node with a higher bus position (Node ID) that does not represent a sleeping node that is not active, and the bus position (Node ID) of the active nodes is optimized.

A further advantageous embodiment of the method is distinguished in that, following determination of the necessary download data rate, a currently free data rate in the Ethernet network in the last bus cycle ($D_{frei}$) of the Ethernet network is determined and a necessary data rate per bus cycle ($D_{zus}$) is determined, wherein, if the free data rate in the Ethernet network in the last bus cycle ($D_{frei}$) of the Ethernet network is greater than or equal to the necessary data rate per bus cycle ($D_{zus}$), no change is made in the next bus cycle, and if the free data rate in the Ethernet network in the last bus cycle ($D_{frei}$) of the Ethernet network is less than the necessary data rate per bus cycle, a change is made in the next bus cycle.

Particularly advantageous is an implementation by a control unit for an Ethernet network, which, as first node, is designed, as control unit: to transmit a signal to a second control unit of the Ethernet on-board network and to receive the signal from the second control unit; to determine a propagation time of the signal on a connection path to the second control unit; to determine a maximum speed of the connection path based on the propagation time; and to determine a type of a transmission medium of the connection path based on the maximum speed, at least comprising a microprocessor, a volatile memory and non-volatile memory, at least two communication interfaces, a synchronizable timer, the non-volatile memory containing program instructions that, when executed by the microprocessor, wherein at least one embodiment of the method according to an aspect of the invention is able to be implemented and executed.

Particularly advantageous is the implementation by an Ethernet network for a motor vehicle, having a first control unit and a second control unit, wherein the control units are connected to one another via at least one connection path, and the first control unit is designed to perform the method according to an aspect of the invention.

One particularly advantageous embodiment of the Ethernet on-board network is distinguished in that the Ethernet network has a third control unit, which is connected to the first control unit only indirectly and is connected to the second control unit directly by way of a third connection path, wherein the third control unit is designed to determine a propagation time of a third signal on the third connection path, wherein the first control unit is designed to trigger the determination of the propagation time of the third signal by way of a service message to the third control unit.

By implementing the methods disclosed by an aspect of the invention, it is possible to use platform-independent software with higher quality and durability. An aspect of the invention may be used in other communication systems with clock synchronization components and embedded systems.

BRIEF DESCRIPTION OF THE DRAWINGS

An exemplary embodiment of the invention is depicted in the drawings and will be described in greater detail below. In the drawings.

DETAILED DESCRIPTION OF EXEMPLARY EMBODIMENTS

FIG. 1 shows the simplified illustration of the differences between an Ethernet bus (10 Mbit/s) and a switched network.

An aspect of the invention proposes a new method to optimize the efficiency of data transmission on the automotive 10 Mbit/s bus and to reduce the bus access time for the nodes.

FIG. 2 shows the basic flow of communication on the Ethernet bus. After the beacon has been transmitted, it is the turn of node 0 first and, when it has finished its transmission, the next node is allowed to transmit (typically only a single Ethernet frame in each case may be transmitted in the slot).

The basic idea of the method according to an aspect of the invention describes a dynamic adaptation of the bus cycle. Unlike FlexRay, this has no negative or ill-considered effects. The nodes do not have a fixedly defined time window, but only follow an order. The head node also does not know which data are sent by the nodes beforehand.

FIG. 3 shows the physical representation of the Ethernet bus with stubs.

The method first determines all participants on the bus. This is typically statically preconfigured, since the head node needs to know this number of participants to schedule the flow.

FIG. 4 shows that, in the case of sleeping nodes, the bus not only massively wastes bandwidth, but also needlessly increases the latency of the other nodes.

FIG. 5 shows the dynamic adaptation of the transmission time windows. The head node then determines all sleeping or defective or inactive nodes on the bus. A distinction may be made here as to whether they are currently sleeping or whether a time in the future is known when the nodes are inactive—sleeping or inactive in this connection means that they are not participating in the bus communication (neither active—transmitting user data—nor passive—receiving user data). The head node receives this knowledge either via a higher software layer or application communicated by a message from one or the participant on the bus, for example a response to a sleep/wake-up signal due to an error state of a node, for example through a request from the network management, checking of protocols, reading of registers on the node.

FIG. 6 shows the solution and advantage of individually shortening and adapting the schedule or bus cycle. By transmitting the beacon frame earlier, illustrated as 'B', the following cycles are always able to be performed earlier. The transmission slots of the individual nodes may be between 64 and 1522 bytes in size and are always shown with the same size merely for the sake of simplicity.

Figure 7:
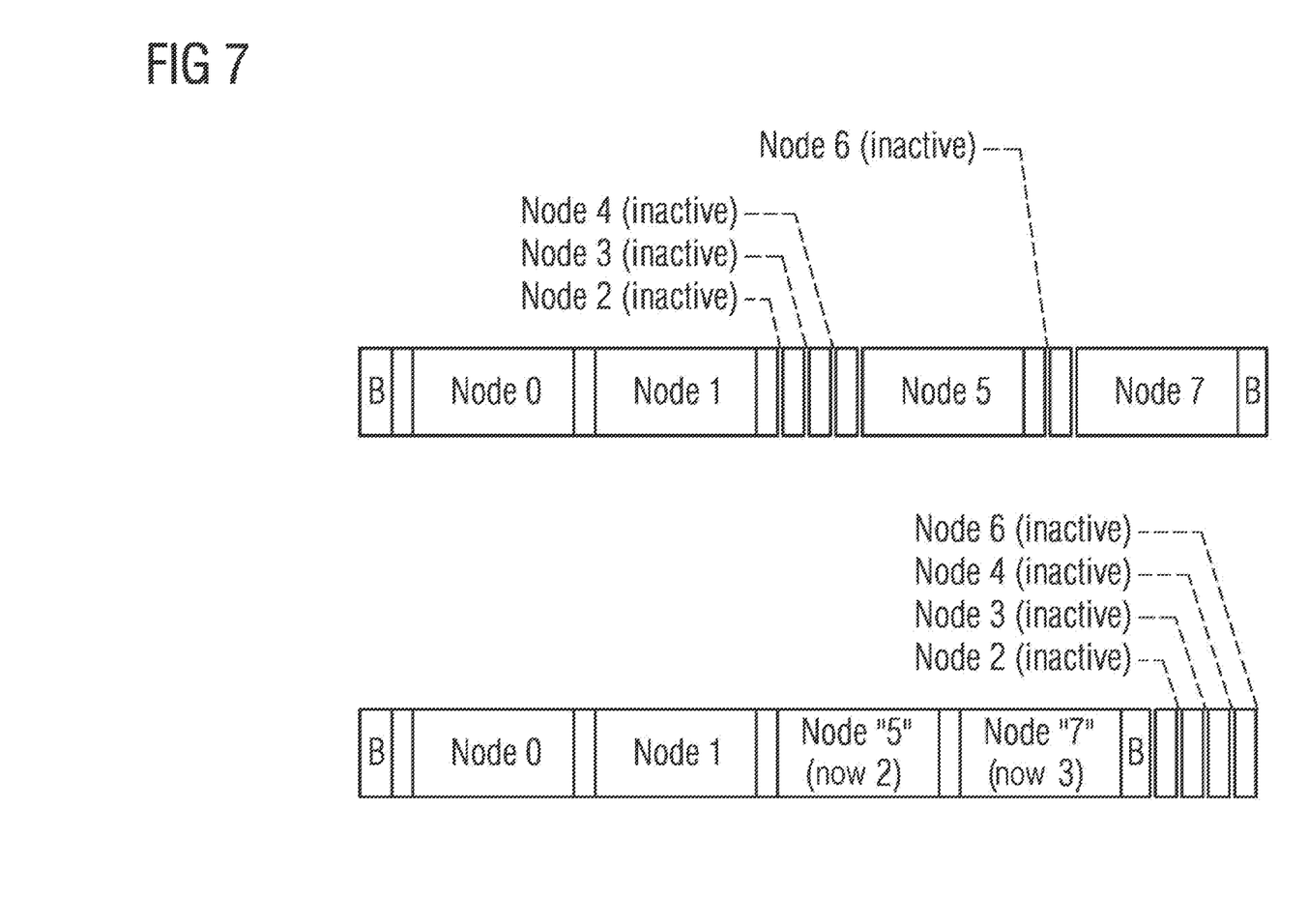
FIG. 7 shows a further example of shortening an unnecessarily long schedule without the optimization proposed here (above) and after optimization/shortening (below)

FIG. 7 shows a further example of shortening an unnecessarily long schedule without the optimization proposed here (above) and after optimization/shortening (below).

Figure 8:
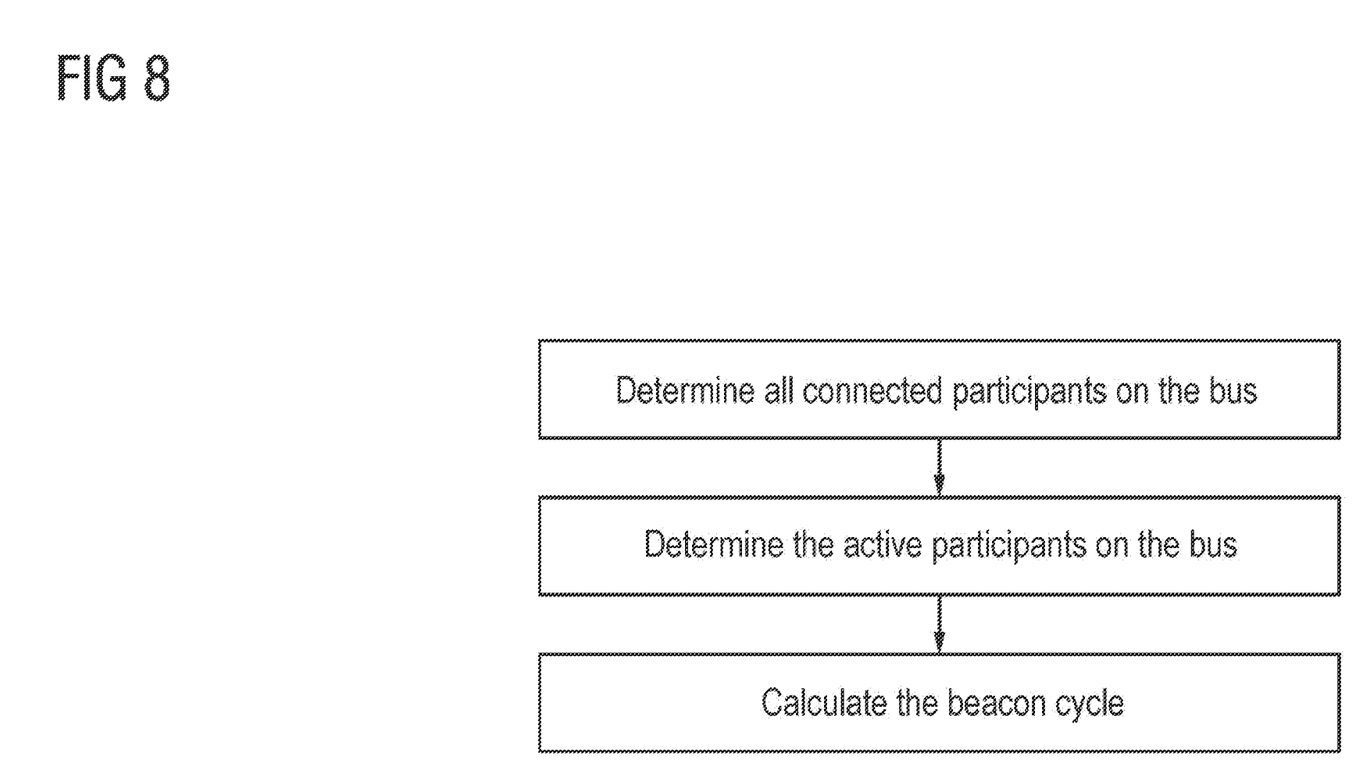
FIG. 8 shows the calculation of the next beacon cycle with the minimum and the maximum.

FIG. 8 shows the calculation of the next beacon cycle with the minimum and the maximum.

The beacon cycle (or when the next beacon is transmitted or how many nodes are active on the bus) may be calculated by determining the number of sleeping or defective or inactive participants. Per se, with the remaining number of active nodes, regardless of what ID they have, it may first be calculated how much time it is possible to save on the bus or by how much the bus cycle is able to be shortened.

With a cycle length in normal mode of $Z$=participant*(transmission window+frame size) is thus generally reduced to $Z'$=(participant−non-activeparticipant)*(transmission window+frame size).

Figure 9:
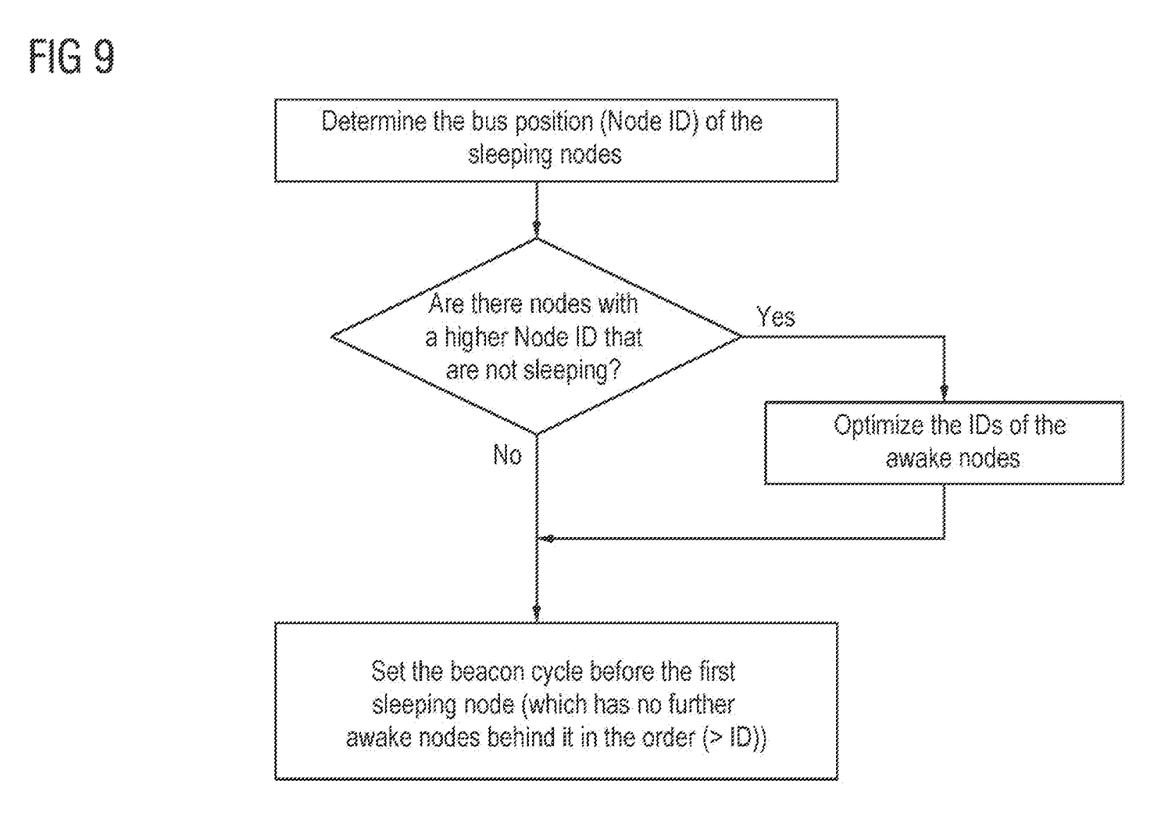
FIG. 9 shows the determination of the time of sending of the beacon on the basis of the position (here: Node ID) of the active/sleeping nodes.

FIG. 9 shows the determination of the time of sending of the beacon on the basis of the position (here: Node ID) of the active/sleeping nodes.

All nodes on the bus have a unique ID. The method uses the total number of nodes and the ID to determine the position of the sleeping participants per bus cycle. The number of participants on the automotive 10 Mbit/s Ethernet bus is limited by the bus topology, and it is thus easy to get an overview of whether there is an active node "behind" the sleeping or possibly faulty node (IDsleepingnode<IDactivenode).

Figure 10:
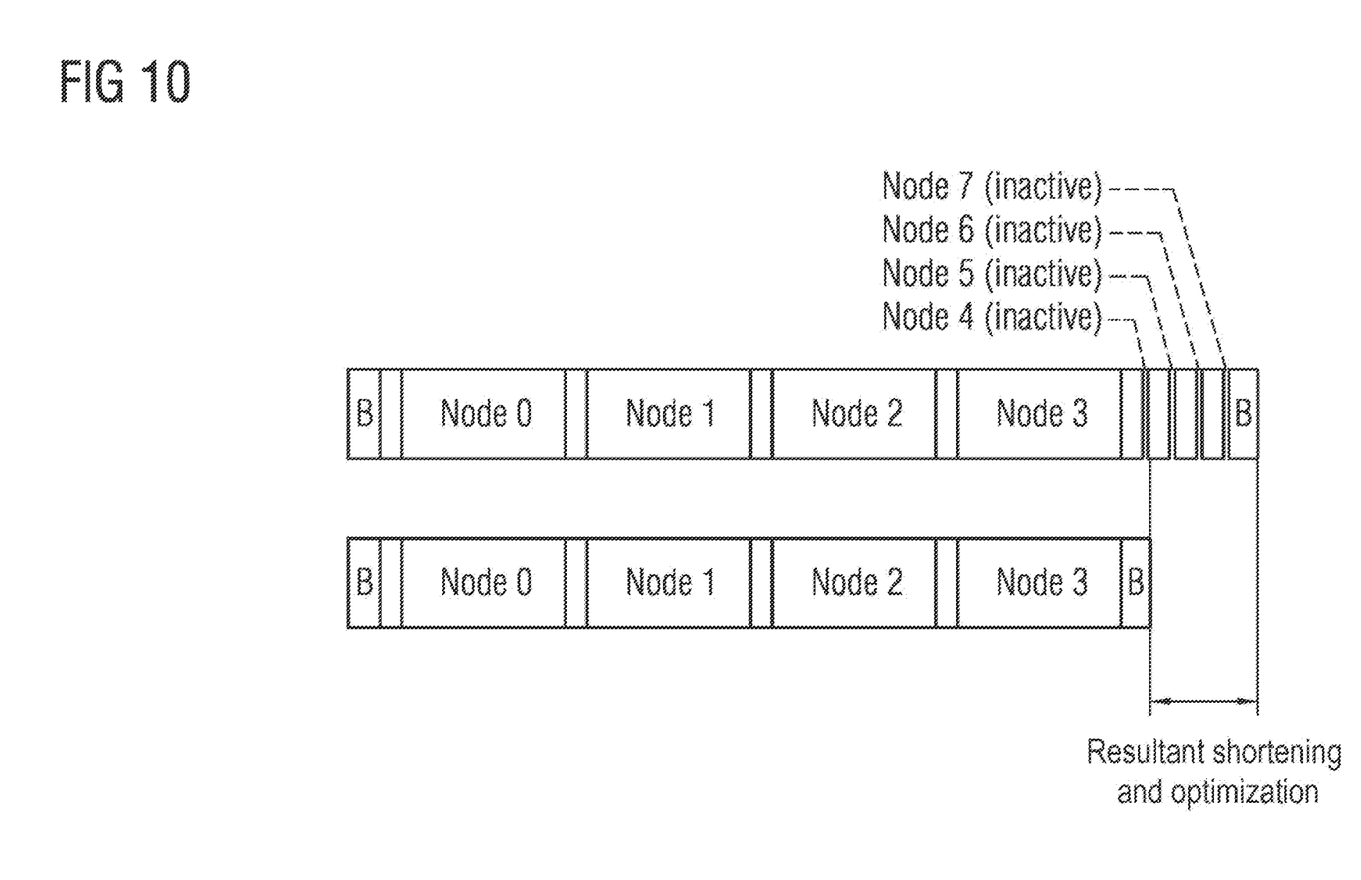
FIG. 10 shows the shortening and optimization of the cycle time through early transmission of the next beacon frame in the case of exclusively inactive participants at the "end" of the bus (highest Node IDs)

If there are no further active nodes up to the highest ID, then the beacon cycle is adapted such that the beacon is set before the transmission slot, the so-called transmit opportunity, of the first sleeping node, which only has active nodes in front and sleeping nodes behind it. This method assumes that there is no further active node, or ECU, sensor, behind the sleeping node, that is to say higher ID, as indicated in FIG. 10. This probability is relatively high since the 10 Mbit/s Ethernet bus system in the automotive environment is nowadays typically designed for 8 ECUs.

FIG. 10 shows the shortening and optimization of the cycle time through early transmission of the next beacon frame in the case of exclusively inactive participants at the "end" of the bus, thus the highest Node IDs.

However, if a node with a small ID no longer participates on the bus, then an aspect of the invention proposes adapting or optimizing the IDs of the participants.

Figure 11:
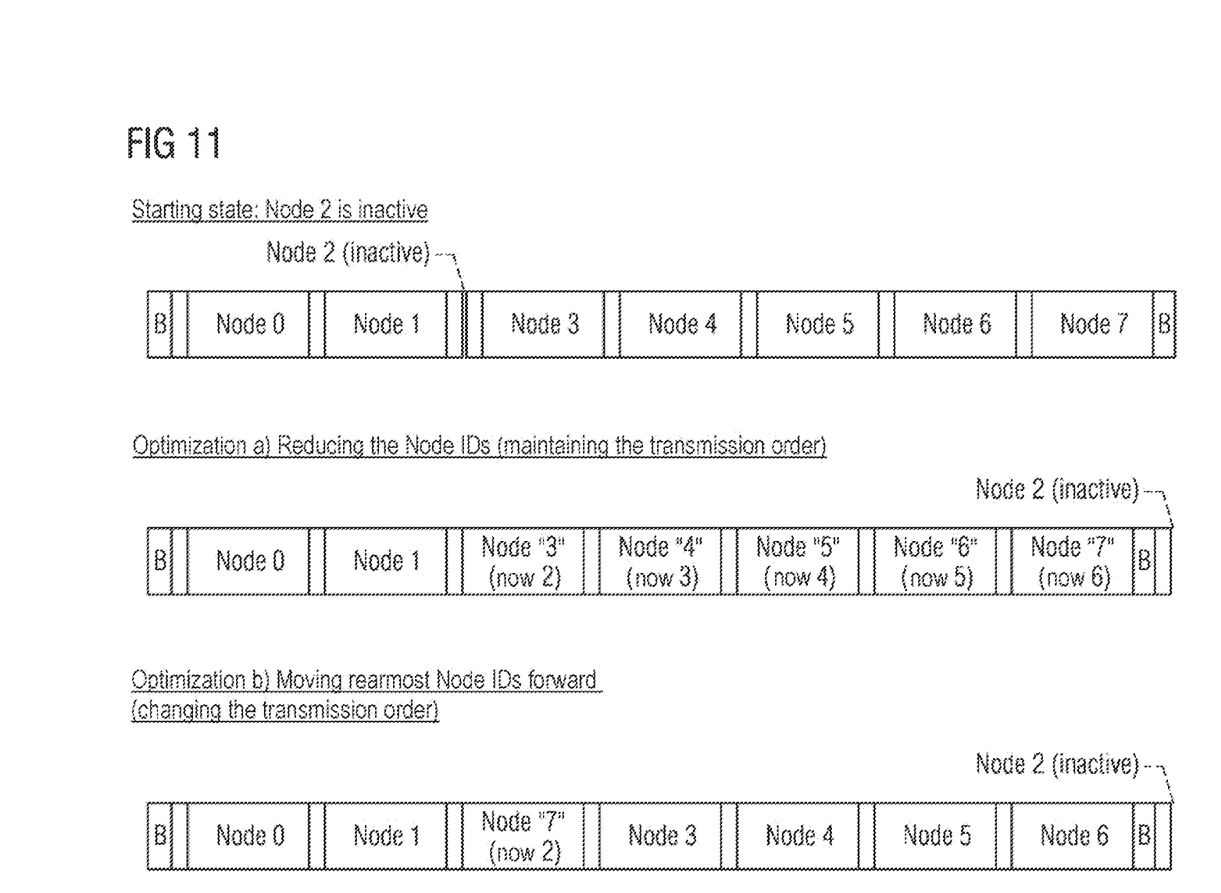
FIG. 11 shows the various options for optimizing the bus cycle using the example of only one sleeping node (ID 2).

There are several proposals according to an aspect of the invention in this regard, as illustrated in FIG. 11. The selection or a combination of the methods may be adapted depending on the application case:

The IDs of all active participants on the bus with a higher ID are reduced beforehand by the number of sleeping nodes. If for example ID 3 is sleeping, then ID 4 is reduced by one. This maintains the transmission order of the bus participants.

Another possibility is to fill up the sleeping IDs with participants with the highest ID. If ID 3 is sleeping, then this ID is reassigned to the highest one (for example ID 8). Although this changes the order of the bus participants, fewer bus participants need to be reconfigured.

FIG. 11 shows the various options for optimizing the bus cycle using the example of only one sleeping node (ID 2).

To avoid useless optimization or adaptation of the bus cycle, the method proposes determining the current bus loading. The current loading may be determined by the time difference of the last beacons and the number of participating nodes. If the bus loading is low, it may be statistically assumed that it will not increase abruptly toward the next cycle. However, it is still possible to react to any changes, as it is proposed to monitor the bus loading continuously.

In the last step, the bus cycle is adapted in respect of the required data rate. Two possibilities will be proposed later for this.

In one advantageous substep, the method in which the necessary data rate is compared to the current bus capacity may be determined. First, the necessary download data rate is calculated here in relation to the 10 Mbit bus. Then the number of active nodes is determined by the head node. The slots of the inactive participants, either only passively listening, in the error state, or in sleep mode, are determined and are to be made available by the method for the head node, which is referred to as $D_{frei}$.

This already results in an optimization of the bus without in the process actively intervening in the ongoing communication or without in the process muting nodes. The real data rate may then also be reported back to the application without in the process always having to assume the worst case. This saves memory and gives the application, possibly also the driver, a real time window back. This method is the first step toward optimizing the cycle.

Another possible optimization step is described, to prevent a subset (or also all) of the other participants on the bus (except of course the head node) from transmitting, based on the calculated, necessary data rate at the head node, and thus to reduce the cycle time for the purpose of the download (or security update), so that the head node is able to serve its necessary data rate, even if, according to normal bus operation, there would not be enough bandwidth available. For this purpose, the amount of data the head node would still have to transmit in the current cycle is constantly compared, wherein this value is taken as a limit value, which must not fall below 0 in this cycle and wherefore the cycle would be terminated before by the transmission of the next beacon. This method results in the highest possible fairness toward the other bus participants, because, only within certain tolerances, as much bandwidth as needed is used for the head node and the rest is still available for use by the following nodes. The amount of nodes that may still transmit in a cycle due to this remaining bandwidth cannot be predicted exactly, since each bus participant may be between 0 (transmits no data at all), 64 (transmits a minimum Ethernet frame) and 1522 bytes (transmits a maximum Ethernet frame).

To increase fairness even further, it is proposed that, in the event that a node is no longer able to transmit and the cycle is terminated by the next beacon (because the remaining required data rate in that slot falls below a potential maximum Ethernet frame), the "remaining bandwidth" is carried over into the next cycle and released for use by the other bus participants in the next cycle. In this way, a kind of "credit" may be built up despite the bandwidth requirement at the head node being met.

However, to prevent the credit from increasing too much and thus potentially causing large data bursts in which many of the other bus participants are able to transmit large amounts of data unhindered, it is likewise proposed to limit the increase in the credit, either in terms of time by saturating or resetting the credit after a configurable period of time in seconds, or by a cycle counter when saturating or resetting the credit after a configurable number of bus cycles.

This type of cycle optimization is not the only conceivable one. An intermediate solution between "no fairness" and "greatest possible fairness" could be a simpler method, for example, in which only the head node is allowed to transmit over several cycles and a large credit builds up accordingly quickly. After a certain threshold value, this may then be reduced in one go by then inserting a cycle in which all nodes are given the opportunity to transmit before they then have to "sit out" again for a certain number of cycles. If desired, in order to simplify the method, this variant may also be implemented without any consideration of credit, but simply according to the number of cycles—for example "99 cycles only head node transmits, then 1 cycle all nodes". In this case, however, a certain jitter (variance) in the data rate of the head node cannot be excluded.

The method according to an aspect of the invention may be performed through alternative method steps by means of which, after determining the number of active nodes, the unused transmission possibilities are determined and the absolute data rate for the head node is thereby calculated per time unit.

In the following, an aspect of the invention proposes for the already presented method to determine the trustworthiness of a communication partner or its application. Provided that this trustworthiness is determined, the exchange of sensitive data may thus be carried out.

The head nodes on the server, for example, are typically connected on the PCB (printed circuit board) via MII (Media Independent Interface) or PCI Express and thus may always manage without transceivers (PHYs).

An Ethernet transceiver (PHY) causes a delay in the 3-digit nanosecond range. This sounds small, but the delay on layer 2 (MAC) is approximately in the 1-digit nanosecond range or tends toward 0—depending on how high the resolution of the measurement is.

The method first of all determines the address of the application with which data are to be exchanged (received, sent or both).

The method then starts a propagation time measurement for this component. For example, the PDelay_Request method of the gPTP protocol (or 802.1AS) may be used here. Two responses are sent back in response, and hardware timestamps may be used to determine the propagation time of the message. (The use of a protocol with hardware timestamps is important—NTP, for example, is thus ruled out because the resolution is too imprecise).

With the help of this calculated value, the method calculates the physical distance to this participant. The distance is not directly expressed here by a unit of measurement such as meters or centimeters, for example, but may be converted to the number of components (PHYs, switches) that are part of the connection, since this delay is significant in contrast to the delay on the actual cable.

As an alternative, the method measures the propagation time to a participant/address by starting propagation time measurements (for example part of the PTP protocol) and by calculating the distance to this participant therefrom.

The measured propagation time must first be evaluated in order to provide an indication of the location. The software cannot know whether or not a partner is located within the same ECU, or ideally it must not know if a generalized SW and not a special version is used; in addition, IP addresses may be falsified or changed. The propagation time of an MII-based connection does not need PHYs (transceivers). However, neither the time synchronization software nor the actual application commissioning this investigation knows this. A PHY converts the data into electrical signals and encodes them, which takes much more time than when two Ethernet MACs communicate with each other over the MII-based lines.

The method presented also recognizes whether a participant is connected directly to the requesting participant. If this is not the case, the respectively appropriate protocol may be selected depending on the latency. For example, MAC-Sec or IP-Sec could be used for latencies that apply within the vehicle, and other IP/TCP-based methods could be used if the latency is so high that the participant is undoubtedly outside the vehicle.

The invention claimed is:

1. A method for optimizing the transmission data rate in a sensor network in partial networking in an Ethernet network, wherein the method comprises:
    a) determining a number of active nodes, by a head node;
    b) classifying, by the head node, nodes identified in the Ethernet network into two or more classifications of nodes in order to prioritize the Ethernet network communication;
    c) receiving, by the head node, reservation requests from at least some of the identified nodes;
    d) allocating time slots, in response to reservation requests, to one or more nodes in an upcoming communication window, the allocated time slots being based on a priority of the nodes and the priority being allocated to the nodes in accordance with a classification of the nodes;
    e) after determining the number of active nodes, calculating a bus cycle length and determining a number of sleeping, inactive, or defective nodes, wherein a beacon bus cycle is determined in terms of how much the bus cycle length is able to be shortened based on the determined number of sleeping, inactive, or defective nodes.

2. The method as claimed in claim 1, wherein a bus loading is monitored continuously, and following bus cycles are performed earlier through an earlier transmission of the beacon.

3. The method as claimed in claim 1, wherein, following determination of the bus position of the sleeping nodes, a check is performed to determine whether a node with a higher bus position that does not represent a sleeping node that is not active exists, and the bus position of the active nodes is optimized.

4. A control unit for an Ethernet on-board network, which, as a first node, is designed, as a control unit configured to:
    transmit a signal to a second control unit of the Ethernet on-board network and receive the signal from the second control unit;
    determine a propagation time of the signal on a connection path to the second control unit;
    determine a maximum speed of the connection path based on the propagation time; and
    determine a type of a transmission medium of the connection path based on the maximum speed,
    the control unit comprising:
    a microprocessor,
    a volatile memory and non-volatile memory,
    at least two communication interfaces,
    a synchronizable timer,
    the non-volatile memory containing program instructions that, when executed by the microprocessor, implement and execute
    the method as claimed in claim 1.

5. An Ethernet on-board network for a motor vehicle, having a first control unit and a second control unit, wherein the control units are connected to one another via at least one connection path, and the first control unit is designed as claimed in claim 4.

6. The Ethernet on-board network as claimed in claim 5, further comprising a third control unit, which is connected to the first control unit only indirectly and is connected to the second control unit directly by way of a third connection path, wherein the third control unit is designed to determine a propagation time of a third signal on the third connection path, wherein the first control unit is designed to trigger the determination of the propagation time of the third signal by way of a service message to the third control unit.

7. A non-transitory computer program product comprising commands that, when the program is executed by a computer, cause said computer to carry out the method as claimed in claim 1.

8. A non-transitory computer-readable medium on which the computer program product as claimed in claim 7 is stored.

9. A vehicle having an Ethernet on-board network comprising multiple control units as claimed in claim 4.

* * * * *